US011647292B2

(12) United States Patent
Himukashi

(10) Patent No.: US 11,647,292 B2
(45) Date of Patent: May 9, 2023

(54) IMAGE ADJUSTMENT SYSTEM, IMAGE ADJUSTMENT DEVICE, AND IMAGE ADJUSTMENT

(71) Applicant: JVCKENWOOD CORPORATION, Yokohama (JP)

(72) Inventor: Takashi Himukashi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 185 days.

(21) Appl. No.: 17/304,992

(22) Filed: Jun. 29, 2021

(65) Prior Publication Data

US 2021/0329171 A1 Oct. 21, 2021

Related U.S. Application Data

(63) Continuation of application No. PCT/JP2020/005238, filed on Feb. 12, 2020.

(30) Foreign Application Priority Data

Feb. 15, 2019 (JP) .............................. JP2019-025373
Feb. 15, 2019 (JP) .............................. JP2019-025375
Feb. 15, 2019 (JP) .............................. JP2019-025377

(51) Int. Cl.
*H04N 5/232* (2006.01)
*H04N 23/695* (2023.01)
*H04N 13/106* (2018.01)
*H04N 13/344* (2018.01)
(Continued)

(52) U.S. Cl.
CPC ......... *H04N 23/695* (2023.01); *H04N 13/106* (2018.05); *H04N 13/239* (2018.05); *H04N 13/344* (2018.05); *H04N 23/698* (2023.01)

(58) Field of Classification Search
CPC ........... H04N 5/23299; H04N 5/23238; H04N 13/344; H04N 13/122; H04N 13/238; H04N 13/106; G06T 19/00
See application file for complete search history.

(56) References Cited

U.S. PATENT DOCUMENTS

2016/0048230 A1* 2/2016 Shimoda .............. H04N 13/156
345/633

FOREIGN PATENT DOCUMENTS

JP   2005-56295 A    3/2005
JP   2005056295      * 3/2005

* cited by examiner

*Primary Examiner* — Kathleen V Nguyen
(74) *Attorney, Agent, or Firm* — Nath, Goldberg & Meyer; Jerald L. Meyer

(57) ABSTRACT

An image adjustment system includes a camera, an image adjustment device, an image display device, and a controller. The image display device displays a captured image adjusted by the image adjustment device. The image adjustment device includes an image generator and an image processor. The image generator generates a spherical surface image. The image processor acquires the spherical surface image from the image generator to display the spherical surface image on the image display device on the basis of instruction information output from the controller. The image processor rotates the spherical surface image on the basis of the instruction information. The image processor adjusts a right-eye image or a left-eye image of the captured image displayed on the image display device in accordance with a rotation of the spherical surface image.

14 Claims, 12 Drawing Sheets

(51) Int. Cl.
*H04N 13/239* (2018.01)
*H04N 23/698* (2023.01)

IMAGE ADJUSTMENT SYSTEM, IMAGE ADJUSTMENT DEVICE, AND IMAGE ADJUSTMENT

CROSS REFERENCE TO RELATED APPLICATION

This is a continuation application based on PCT application No. PCT/JP2020/005238 filed on Feb. 12, 2020, which claims the benefit of priority from Japanese Patent Applications No. 2019-025373, No. 2019-025375, and No. 2019-025377 filed on Feb. 15, 2019, the entire contents of which are incorporated by reference herein.

BACKGROUND

The present invention relates to an image adjustment system, an image adjustment device, and an image adjustment method.

A head-mounted display has recently attracted attention as an image display device. The head-mounted display, while being mounted on the head of the user, can provide a user with a sense (immersion) of entering a virtual space by displaying an image. As described in Japanese Patent Application Laid-Open No. 2005-56295 (Patent Document 1), the head-mounted display can display an image captured by an external camera through a network.

The head-mounted display displays an image captured by using a stereo camera capable of capturing a right-eye image and a left-eye image as an omnidirectional camera capable of capturing the range of 360 degrees, and thus the user can view the image displayed on the head-mounted display in three dimensions.

However, when the right-eye image and the left-eye image have a large misalignment therebetween, the user may have a symptom similar to motion sickness called VR (Virtual Reality) sickness. VR sickness is likely to occur when there is a large misalignment in the up-down direction between the right-eye image and the left-eye image, a large parallax between the right-eye image and the left-eye image, or a large difference in tilt between the right-eye image and the left-eye image.

SUMMARY

According to a first aspect of the embodiments, there is provided an image adjustment system, including: a camera configured to capture a right-eye image and a left-eye image; an image adjustment device configured to acquire the right-eye image and the left-eye image from the camera as a captured image and adjust the captured image; an image display device configured to display the captured image adjusted by the image adjustment device; and a controller configured to output instruction information to the image adjustment device, wherein the image adjustment device includes: an image generator configured to generate a spherical surface image; and an image processor configured to acquire the spherical surface image from the image generator to display the spherical surface image on the image display device on the basis of the instruction information, rotate the spherical surface image on the basis of the instruction information, and adjust the right-eye image or the left-eye image of the captured image displayed on the image display device in accordance with a rotation of the spherical surface image.

According to a second aspect of the embodiments, there is provided an image adjustment device, including: an image generator configured to generate a spherical surface image; and an image processor configured to acquire the spherical surface image from the image generator on the basis of instruction information acquired from a controller to display the spherical surface image on an image display device, rotate the spherical surface image on the basis of the instruction information, and adjust a right-eye image or a left-eye image of a captured image captured by a camera and displayed on the image display device in accordance with a rotation of the spherical surface image.

According to a third aspect of the embodiments, there is provided a method of adjusting an image, including: capturing a right-eye image and a left-eye image by a camera; acquiring the right-eye image and the left-eye image from the camera as a captured image by an image processor; displaying the captured image by an image display device; acquiring instruction information from a controller by the image processor; acquiring a spherical surface image from an image generator by the image processor on the basis of the instruction information; displaying the spherical surface image by the image display device; rotating the spherical surface image by the image processor on the basis of the instruction information; and adjusting the right-eye image or the left-eye image of the captured image displayed on the image display device by the image processor in accordance with a rotation of the spherical surface image.

DETAILED DESCRIPTION

First Embodiment

Figure 1:
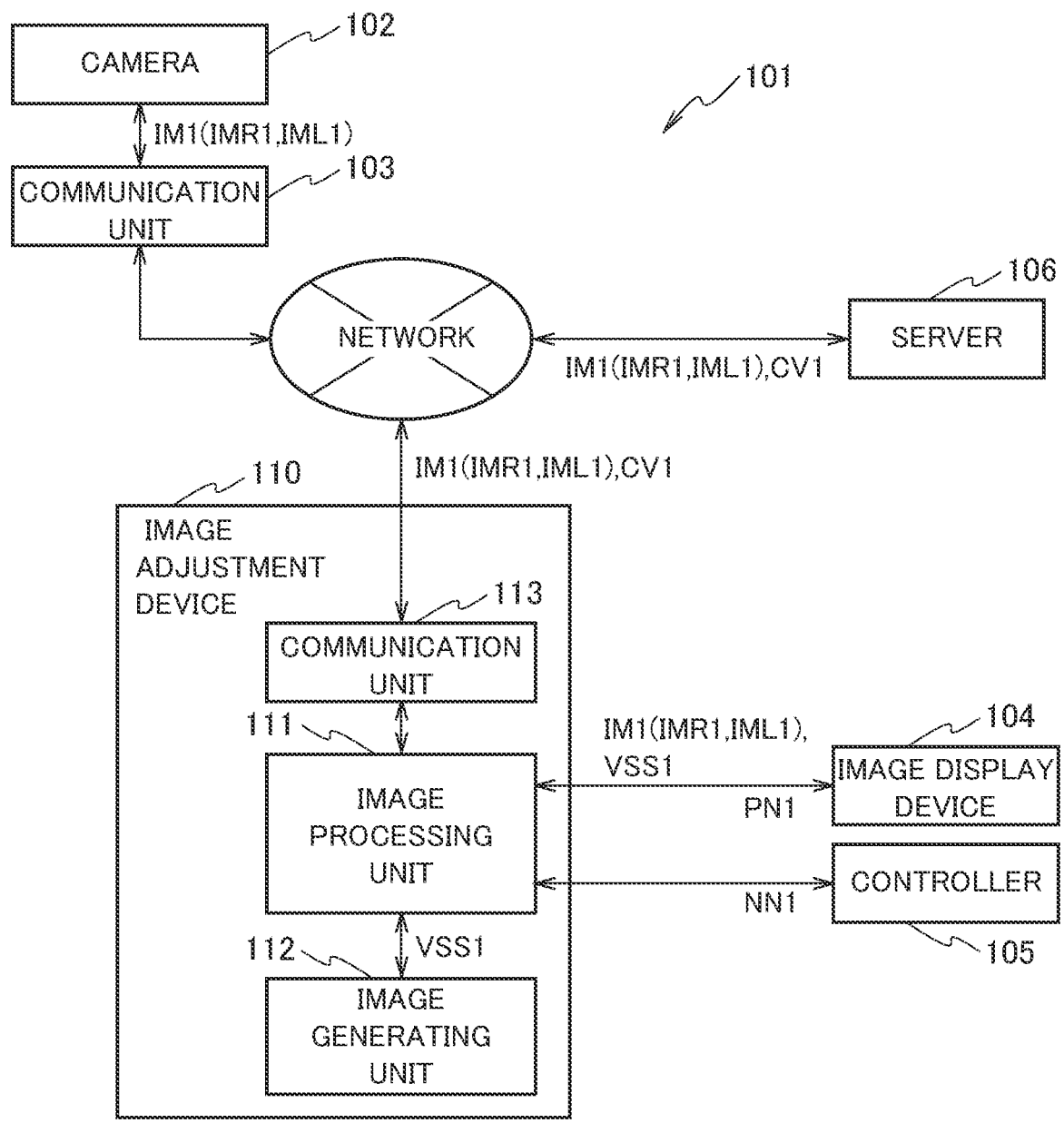
FIG. 1 is a block diagram illustrating an image adjustment system according to a first embodiment.

An example of the configuration of an image adjustment system according to a first embodiment is described below with reference to FIG. 1. An image adjustment system 101 includes a camera 102, a communication unit 103, an image display device 104, a controller 105, an image adjustment device 110, and a server 106. The image adjustment device 110 includes an image processing unit (image processor) 111, an image generating unit (image generator) 112, and a communication unit 113.

The camera 102 is an omnidirectional camera (360-degree camera) capable of capturing the range of 360 degrees and is a stereo camera capable of capturing a right-eye image and a left-eye image. The communication unit 103 and the communication unit 113 are connected through a network. The image adjustment device 110 can acquire a right-eye image IMR1 and a left-eye image IML1 taken by the camera 102 in the range of 360 degrees as a captured image IM1 through the communication units 103, 113 and the network.

Computer equipment may be used as the image adjustment device 110. A CPU may be used as the image processing unit 111 and the image generating unit 112. The image generating unit 112 and the communication unit 113 may be provided outside the image adjustment device 110.

The server 106 is connected to the camera 102 through the network and the communication unit 103 and connected to the image adjustment device 110 through the network and the communication unit 113. The server 106 may acquire the captured image IM1 from the camera 102 through the communication unit 103 and the network, and the image adjustment device 110 may acquire the captured image IM1 from the server 106 through the network and the communication unit 113.

The captured image IM1 acquired by the image adjustment device 110 is input to the image processing unit 111. The image adjustment device 110 performs image processing, such as correction of distortion of the captured image IM1, and outputs the captured image IM1 that is image-processed to the image display device 104. The image display device 104 is, for example, a head-mounted display. The controller 105 is, for example, a glove type controller used for VR or the like.

Figure 2:
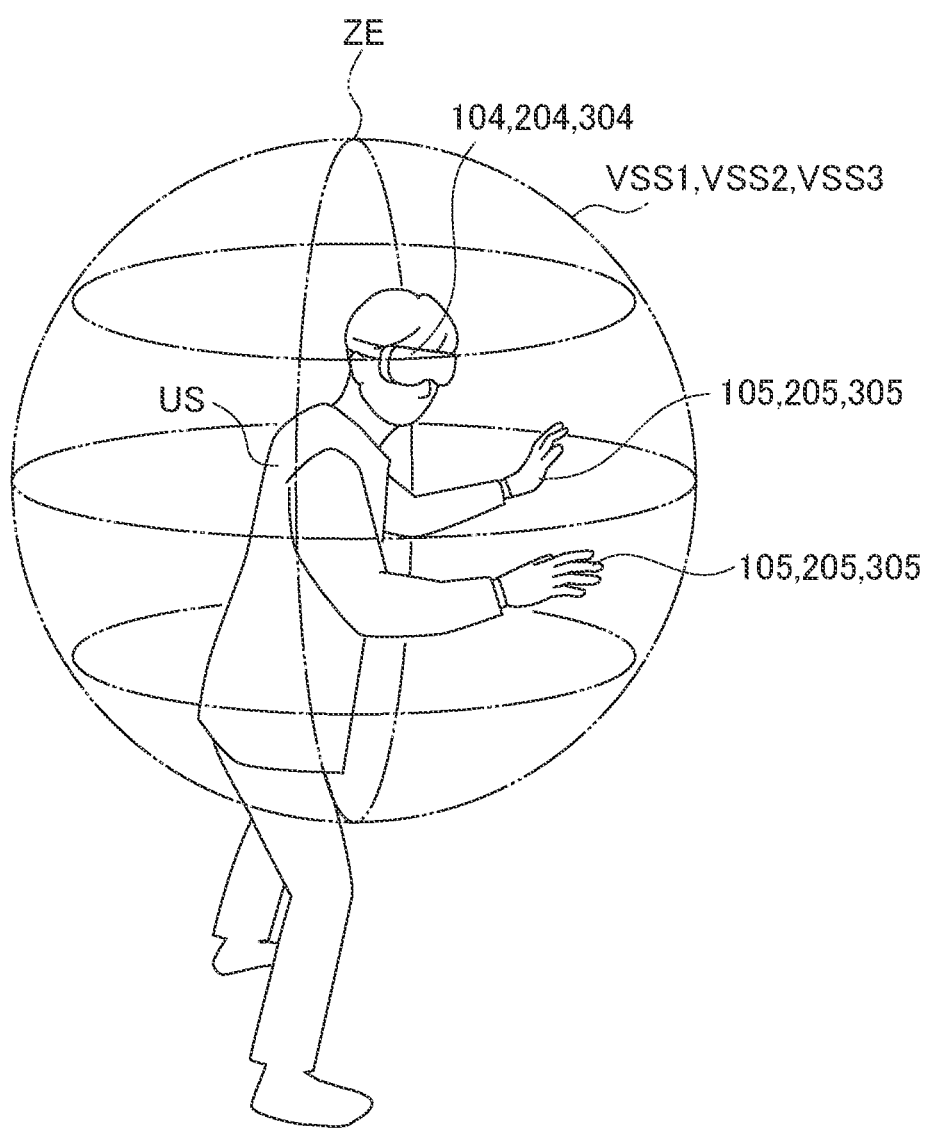
FIG. 2 is a diagram illustrating a relationship between a spherical surface image and a user.

FIG. 2 schematically illustrates the image display device 104 being mounted on the head of a user US and the controller 105 being attached to the hand of the user US. The zenith is indicated by a symbol ZE in FIG. 2. It is desirable that the zenith of the camera 102 and the zenith of the user US coincide. With the image display device 104 mounted on the head of the user US, the image adjustment device 110 displays the right-eye image IMR1 in an area corresponding to the right eye of the user US and the left-eye image IML1 in an area corresponding to the left eye of the user US, so that the user US can view the captured image IM1 as a three-dimensional image.

The server 106 may correct distortion of the captured image IM1 acquired from the camera 102, perform image processing, such as adjustment of the horizontal position of the captured image IM1, and output the captured image IM1 that is image-processed to the image adjustment device 110. By mounting the image display device 104 on the head, the user US can view the captured image IM1 that is image-processed by the image adjustment device 110 or the server 106.

The image display device 104 generates posture information PN1 on the basis of a state of the user US, such as a direction in which the user US faces or a posture of the user US, while being mounted on the head of the user US. The image processing unit 111 acquires the posture information PN1 from the image display device 104. That is, the image processing unit 111 acquires the posture information PN1 on the basis of the posture of the image display device 104. The image processing unit 111 displays on the image display device 104 an image of an area corresponding to the state of the user US, such as a direction in which the user US faces or a posture of the user US, from the captured image IM1 on the basis of the posture information PN1.

The controller 105 generates instruction information NN1 on the basis of a state of the user US, such as a movement of a hand or a posture of the user US or a movement of a finger or a posture of the user US, while being attached to the hand of the user US. Hereinafter, the hand or finger is simply abbreviated as the hand. The image processing unit 111 acquires the instruction information NN1 from the controller 105. The image processing unit 111 can change or adjust the captured image IM1 displayed on the image display device 104 on the basis of the instruction information NN1.

The image generating unit 112 generates a spherical surface image VSS1 that is a virtual image made up by a spherical surface, which is CG (Computer Graphics), and stores the spherical surface image VSS1 in an internal memory or an external memory.

The image processing unit 111 acquires the spherical surface image VSS1 from the image generating unit 112 on the basis of the instruction information NN1 and displays the spherical surface image VSS1 on the image display device 104. FIG. 2 schematically illustrates an image of the user US with the image display device 104 mounted on the head of the user US when the user US views the spherical surface image VSS1 displayed on the image display device 104.

When the user US views the spherical surface image VSS1 displayed on the image display device 104 with the image display device 104 mounted on the head of the user US, the spherical surface image VSS1 is arranged around the user US and the image display device 104 and is set to be displayed within reach of the hand of the user US on the spherical surface image VSS1. The user US feels as if the hand of the user US is in contact with the spherical surface image VSS1 by moving the hand to which the controller 105 is attached to a position corresponding to the spherical surface image VSS1 displayed on the image display device 104.

The controller 105 may include an actuator arranged at a part to be in contact with the hand of the user US. The image processing unit 111 operates the actuator when determining that the hand of the user US has moved to a position corresponding to the spherical surface image VSS1 on the basis of the instruction information NN1. When the actuator applies pressure to the hand of the user US, the user US can actually obtain a sense of the hand in contact with the spherical surface image VSS1.

When the spherical surface image VSS1 is displayed on the image display device 104 and the user US moves the hand to which the controller 105 is attached in an arbitrary direction, the image processing unit 111 performs image processing on the basis of the instruction information NN1 so that the spherical surface image VSS1 and the captured image IM1 displayed on the image display device 104 move in accordance with a moving direction, a moving speed, and a destination position of the hand of the user US.

The user US can rotate the spherical surface image VSS1 in any direction, at any speed, to any position by moving the hand in any direction, at any speed, to any position. That is, the user US can rotate the spherical surface image VSS1 by the movement of the hand. The image processing unit 111 moves the captured image IM1 in accordance with the rotation of the spherical surface image VSS1.

With reference to flowcharts in FIGS. 3A to 3D, an example of an image adjustment method according to the first embodiment is described. Specifically, an example of a method of adjusting misalignment between the right-eye image IMR1 and the left-eye image IML1 is described. The image display device 104 is mounted on the head of the user US, and the controller 105 is attached to the hand of the user US. The image display device 104 displays the captured image IM1 (right-eye image IMR1 and left-eye image IML1).

Figure 3A:
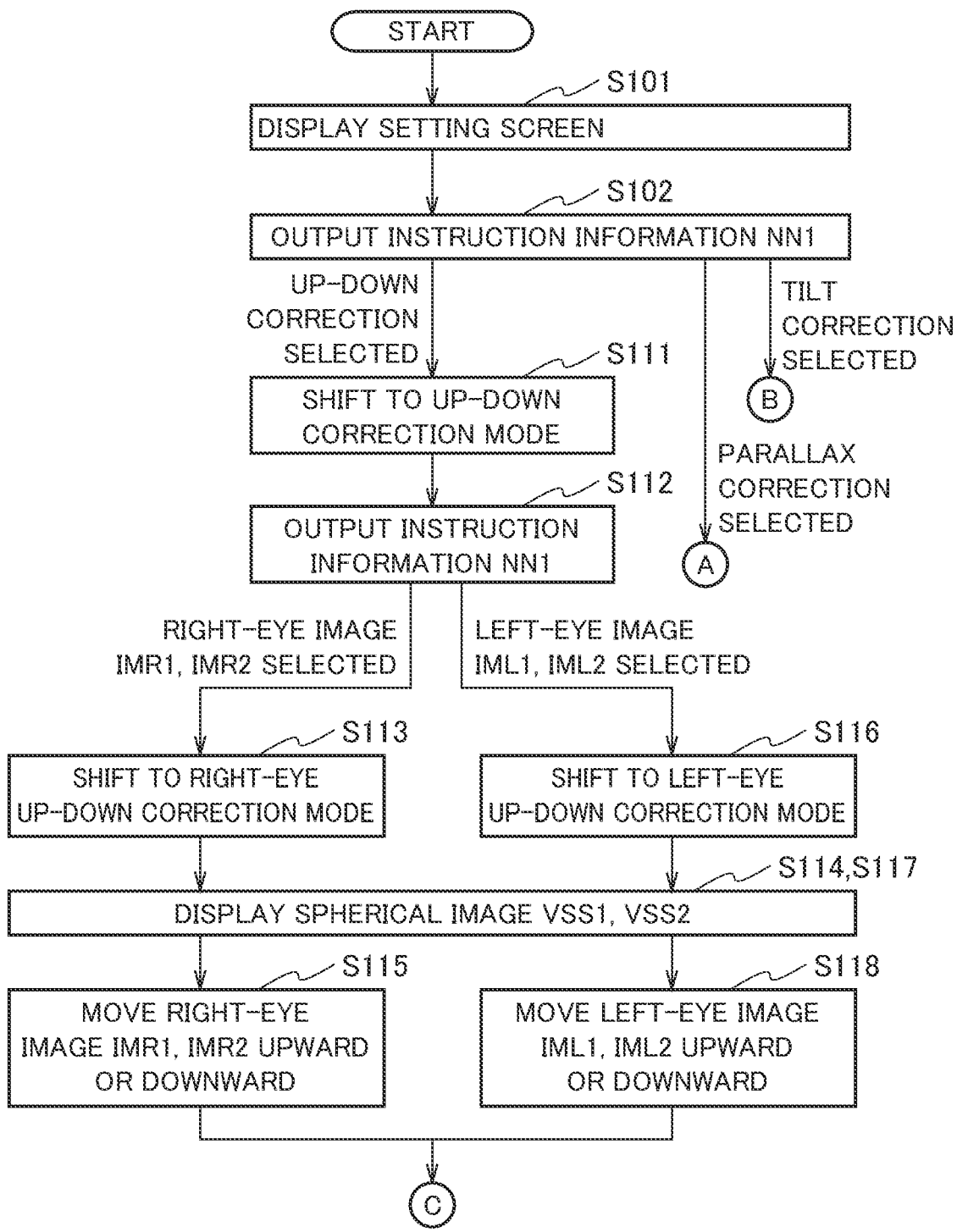
FIG. 3A is a flowchart illustrating an example of an image adjustment method according to the first embodiment.

When the user US views the captured image IM1 displayed on the image display device 104 and feels uncomfortable or experiences VR sickness, the user US operates the controller 105, so that the image processing unit 111 causes the image display device 104 to display a setting screen in step S101 of FIG. 3A.

The setting screen displays adjustment items, such as an item of up-down correction for correcting a misalignment in the up-down direction (vertical direction) between the right-eye image IMR1 and the left-eye image IML1, an item of parallax correction for correcting a parallax between the right-eye image IMR1 and the left-eye image IML1, and an item of tilt correction for correcting a difference in tilt between the right-eye image IMR1 and the left-eye image IML1.

Figure 4:
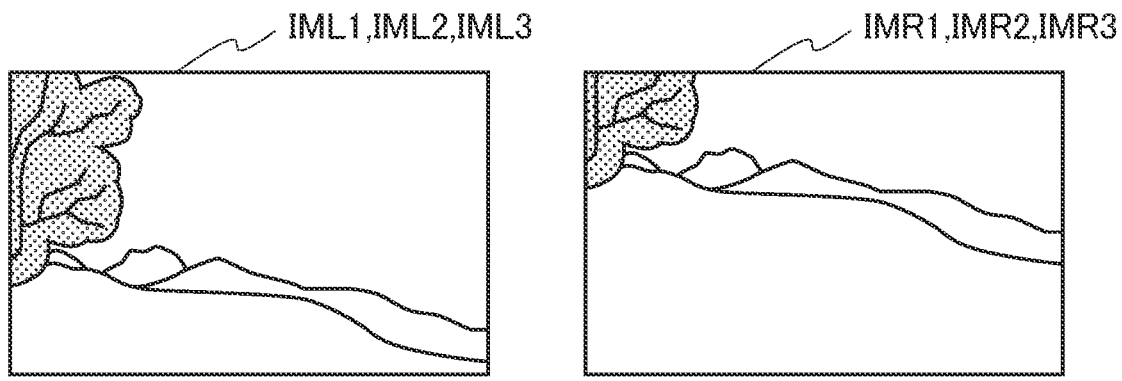
FIG. 4 is a diagram illustrating an example of a right-eye image and a left-eye image misaligned in an up-down direction.
Figure 5:
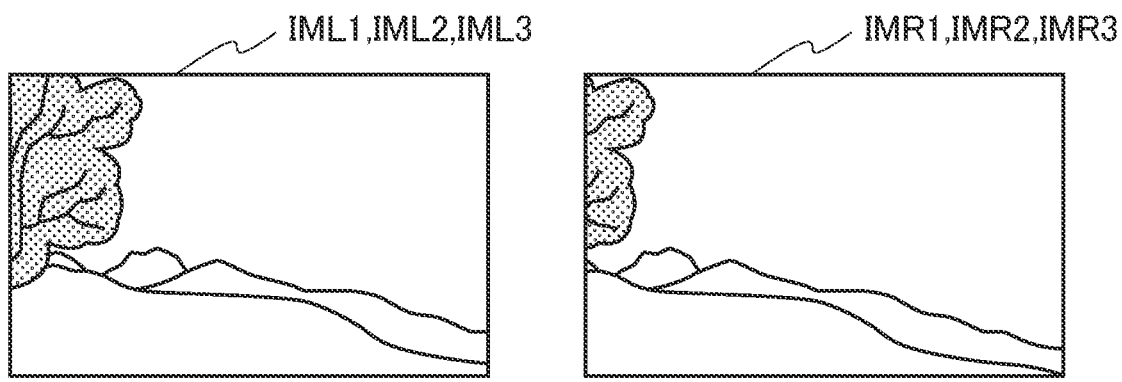
FIG. 5 is a diagram illustrating an example of the right-eye image and the left-eye image having a large parallax.
Figure 6:
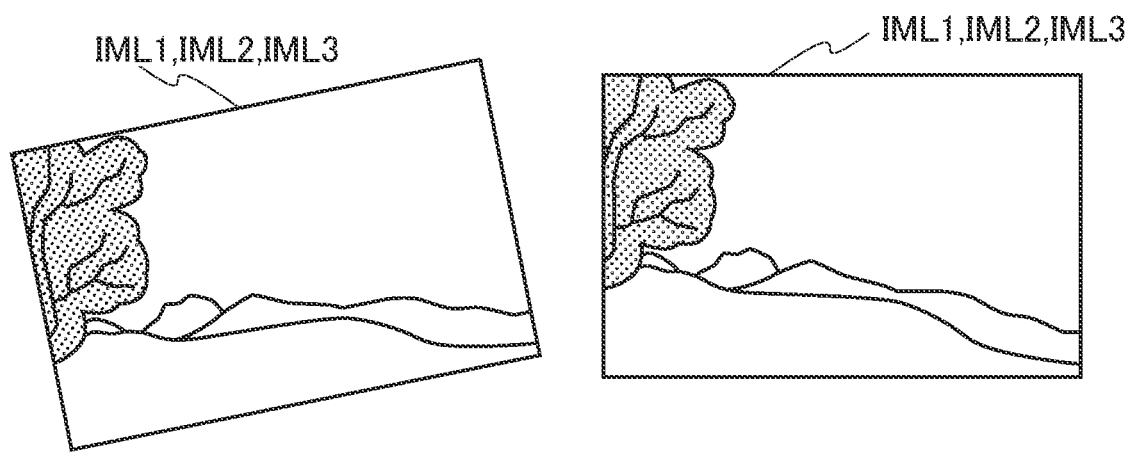
FIG. 6 is a diagram illustrating an example of the right-eye image and the left-eye image having a large difference in tilt.

As illustrated in FIG. 4, when the right-eye image IMR1 and the left-eye image IML1 are misaligned in the up-down direction, the user US operates the controller 105 to select the item of up-down correction displayed on the setting screen. As illustrated in FIG. 5, when the parallax between the right-eye image IMR1 and the left-eye image IML1 is large, the user US operates the controller 105 to select the item of parallax correction displayed on the setting screen. As illustrated in FIG. 6, when the difference in tilt between the right-eye image IMR1 and the left-eye image IML1 is large, the user US operates the controller 105 to select the item of tilt correction displayed on the setting screen.

When the user US selects either one of the items of up-down correction, parallax correction, and tilt correction displayed on the setting screen, the controller 105 outputs the instruction information NN1 including the selected item to the image processing unit 111 in step S102.

When the item of up-down correction is selected in step S101, the controller 105 outputs the instruction information NN1 indicating the selection of the item of up-down correction to the image processing unit 111. In step S111, the image processing unit 111 shifts processing to a processing mode (up-down correction mode) for correcting a misalignment in the up-down direction between the right-eye image IMR1 and the left-eye image IML1 on the basis of the instruction information NN1 output from the controller 105.

In step S112, the image processing unit 111 causes the image display device 104 to display an item for selecting whether the image to be corrected is the right-eye image IMR1 or the left-eye image IML1. When the user US selects the right-eye image IMR1, the controller 105 outputs the instruction information NN1 indicating the selection of the right-eye image IMR1 to the image processing unit 111. In step S113, the image processing unit 111 shifts the processing to a processing mode (right-eye up-down correction mode) for correcting the up-down direction of the right-eye image IMR1 on the basis of the instruction information NN1 output from the controller 105.

In step S114, the image processing unit 111 acquires the spherical surface image VSS1 from the image generating unit 112 and displays the spherical surface image VSS1 on the image display device 104. Displayed on the image display device 104 is a blend of the captured image IM1 (right-eye image IMR1 and left-eye image IML1) and the spherical surface image VSS1.

The user US rotates the spherical surface image VSS1 upward or downward, which is in the vertical direction, to reduce the misalignment in the up-down direction between the right-eye image IMR1 and the left-eye image IML1. In step S115, the image processing unit 111 moves the right-eye image IMR1 displayed on the image display device 104 upward or downward in accordance with the rotation of the spherical surface image VSS1. The user US may rotate the spherical surface image VSS1 multiple times until no misalignment is in the up-down direction between the right-eye image IMR1 and the left-eye image IML1.

In step S112, when the user US selects the left-eye image IML1, the controller 105 outputs the instruction information NN1 indicating the selection of the left-eye image IML1 to the image processing unit 111. In step S116, the image processing unit 111 shifts the processing to a processing mode (left-eye up-down correction mode) for correcting the up-down direction of the left-eye image IML1 on the basis of the instruction information NN1 output from the controller 105.

In step S117, the image processing unit 111 acquires the spherical surface image VSS1 from the image generating unit 112 and displays the spherical surface image VSS1 on the image display device 104. Displayed on the image display device 104 is a blend of the captured image IM1 (right-eye image IMR1 and left-eye image IML1) and the spherical surface image VSS1.

The user US rotates the spherical surface image VSS1 upward or downward to reduce the misalignment in the up-down direction between the right-eye image IMR1 and the left-eye image IML1. In step S118, the image processing unit 111 moves the left-eye image IML1 displayed on the image display device 104 upward or downward in accordance with the rotation of the spherical surface image VSS1. The user US may rotate the spherical surface image VSS1 multiple times until no misalignment is in the up-down direction between the right-eye image IMR1 and the left-eye image IML1.

The image processing unit 111 may limit the direction of rotation of the spherical surface image VSS1 so that the spherical surface image VSS1 rotates only in the up-down direction, when shifting the processing to the up-down correction mode in step S111, the right-eye up-down correction mode in step S113, or the left-eye up-down correction mode in step S116. The right-eye image IMR1 or the left-eye image IML1 may be moved upward or downward by moving the spherical surface image VSS1 upward or downward without rotating the spherical surface image VSS1.

Figure 3B:
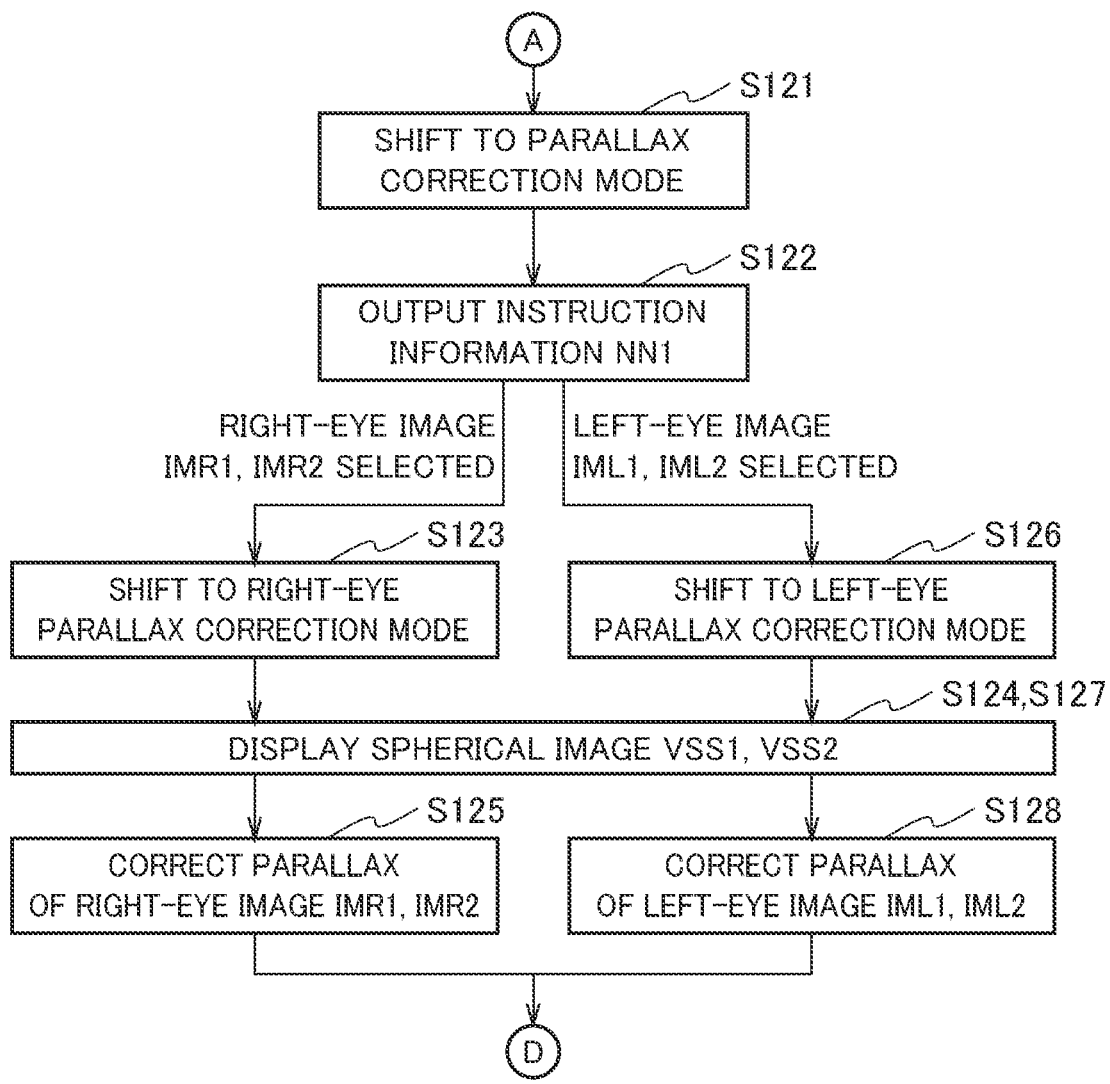
FIG. 3B is a flowchart illustrating an example of the image adjustment method according to the first embodiment.

When the item of parallax correction is selected in step S101, the controller 105 outputs the instruction information NN1 indicating the selection of the item of parallax correction to the image processing unit 111. In FIG. 3B, in step S121, the image processing unit 111 shifts the processing to a processing mode (parallax correction mode) for correcting a parallax between the right-eye image IMR1 and the left-eye image IML1 on the basis of the instruction information NN1 output from the controller 105.

In step S122, the image processing unit 111 causes the image display device 104 to display an item for selecting whether the image to be corrected is the right-eye image IMR1 or the left-eye image IML1. When the user US selects the right-eye image IMR1, the controller 105 outputs the instruction information NN1 indicating the selection of the right-eye image IMR1 to the image processing unit 111. In step S123, the image processing unit 111 shifts the processing to a processing mode (right-eye parallax correction mode) for correcting the parallax of the right-eye image IMR1 on the basis of the instruction information NN1 output from the controller 105.

In step S124, the image processing unit 111 acquires the spherical surface image VSS1 from the image generating unit 112 and displays the spherical surface image VSS1 on the image display device 104. Displayed on the image display device 104 is a blend of the captured image IM1 (right-eye image IMR1 and left-eye image IML1) and the spherical surface image VSS1.

The user US rotates the spherical surface image VSS1 rightward or leftward, which is in the horizontal direction, so that the parallax between the right-eye image IMR1 and the left-eye image IML1 becomes a target parallax. In step S125, the image processing unit 111 corrects the parallax of the right-eye image IMR1 displayed on the image display device 104 in accordance with the rotation of the spherical surface image VSS1. The user US may rotate the spherical surface image VSS1 multiple times until the parallax between the right-eye image IMR1 and the left-eye image IML1 becomes the target parallax.

When the user US selects the left-eye image IML1 in step S122, the controller 105 outputs the instruction information NN1 indicating the selection of the left-eye image IML1 to the image processing unit 111. In step S126, the image processing unit 111 shifts the processing to a processing mode (left-eye parallax correction mode) for correcting the parallax of the left-eye image IML1 on the basis of the instruction information NN1 output from the controller 105.

In step S127, the image processing unit 111 acquires the spherical surface image VSS1 from the image generating unit 112 and displays the spherical surface image VSS1 on the image display device 104. Displayed on the image display device 104 is a blend of the captured image IM1 (right-eye image IMR1 and left-eye image IML1) and the spherical surface image VSS1.

The user US rotates the spherical surface image VSS1 rightward or leftward so that the parallax between the right-eye image IMR1 and the left-eye image IML1 becomes a target parallax. In step S128, the image processing unit 111 corrects the parallax of the left-eye image IML1 displayed on the image display device 104 in accordance with the rotation of the spherical surface image VSS1. The user US may rotate the spherical surface image VSS1 multiple times until the parallax between the right-eye image IMR1 and the left-eye image IML1 becomes the target parallax.

The image processing unit 111 may limit the direction of rotation of the spherical surface image VSS1 so that the spherical surface image VSS1 rotates only in the horizontal direction, when shifting the processing to the parallax correction mode in step S121, the right-eye parallax correction mode in step S123, or the left-eye parallax correction mode in step S126.

Figure 3C:
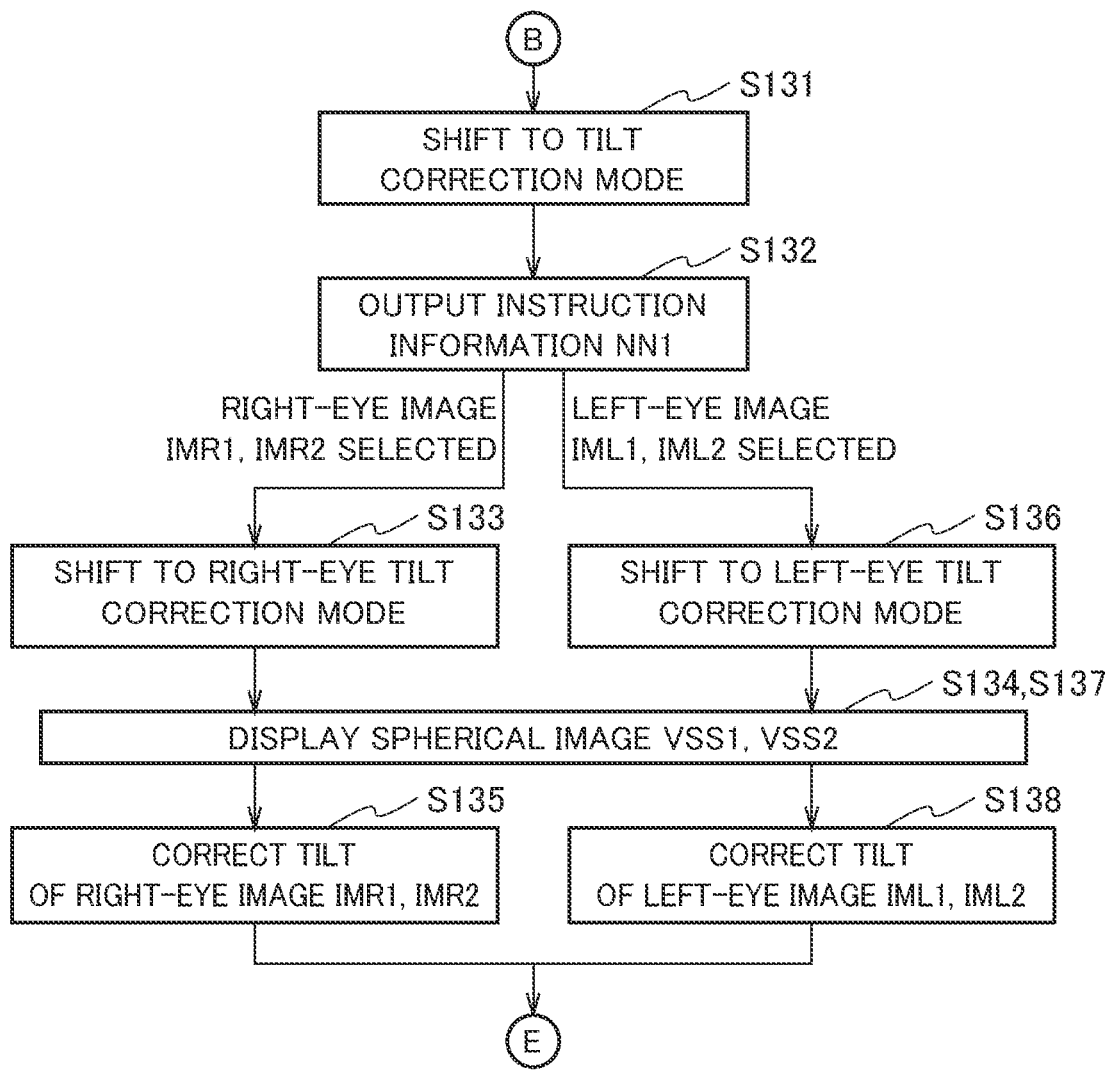
FIG. 3C is a flowchart illustrating an example of the image adjustment method according to the first embodiment.

When the item of tilt correction is selected in step S101, the controller 105 outputs the instruction information NN1 indicating the selection of the item of tilt correction to the image processing unit 111. In FIG. 3C, in step S131, the image processing unit 111 shifts the processing to a processing mode (tilt correction mode) for correcting a difference in tilt between the right-eye image IMR1 and the left-eye image IML1 on the basis of the instruction information NN1 output from the controller 105.

In step S132, the image processing unit 111 causes the image display device 104 to display an item for selecting whether the image to be corrected is the right-eye image IMR1 or the left-eye image IML1. When the user US selects the right-eye image IMR1, the controller 105 outputs the instruction information NN1 indicating the selection of the right-eye image IMR1 to the image processing unit 111. In step S133, the image processing unit 111 shifts the processing to a processing mode (right-eye tilt correction mode) for correcting the tilt of the right-eye image IMR1 on the basis of the instruction information NN1 output from the controller 105.

In step S134, the image processing unit 111 acquires the spherical surface image VSS1 from the image generating unit 112 and displays the spherical surface image VSS1 on the image display device 104. Displayed on the image display device 104 is a blend of the captured image IM1 (right-eye image IMR1 and left-eye image IML1) and the spherical surface image VSS1.

The user US rotates the spherical surface image VSS1 in an arbitrary direction so that a difference in tilt between the right-eye image IMR1 and the left-eye image IML1 becomes smaller. In step S135, the image processing unit 111 corrects the tilt of the right-eye image IMR1 displayed on the image display device 104 in accordance with the rotation of the spherical surface image VSS1. The user US may rotate the spherical surface image VSS1 multiple times until no difference is in tilt between the right-eye image IMR1 and the left-eye image IML1.

In step S132, when the user US selects the left-eye image IML1, the controller 105 outputs the instruction information NN1 indicating the selection of the left-eye image IML1 to the image processing unit 111. In step S136, the image processing unit 111 shifts the processing to a processing mode (left-eye tilt correction mode) for correcting the tilt of the left-eye image IML1 on the basis of the instruction information NN1 output from the controller 105.

In step S137, the image processing unit 111 acquires the spherical surface image VSS1 from the image generating unit 112 and displays the spherical surface image VSS1 on the image display device 104. Displayed on the image display device 104 is a blend of the captured image IM1 (right-eye image IMR1 and left-eye image IML1) and the spherical surface image VSS1.

The user US rotates the spherical surface image VSS1 in an arbitrary direction so that a difference in tilt between the right-eye image IMR1 and the left-eye image IML1 becomes smaller. In step S138, the image processing unit 111 corrects the tilt of the left-eye image IML1 displayed on the image display device 104 in accordance with the rotation of the spherical surface image VSS1. The user US may rotate the spherical surface image VSS1 multiple times until no difference is in tilt between the right-eye image IMR1 and the left-eye image IML1.

The image processing unit 111 does not limit the direction of rotation of the spherical surface image VSS1 when shifting the processing to the tilt correction mode in step S131, the right-eye tilt correction mode in step S133, or the left-eye tilt correction mode in step S136. The user US thus can rotate the spherical surface image VSS1 in any direction.

The image processing unit 111 can determine a position on the coordinate of the spherical surface image VSS1 to which the zenith ZE before rotation of the spherical surface image VSS1 by the user US has moved by the rotation of the spherical surface image VSS1 by the user US. The image processing unit 111 calculates the amount of change of the spherical surface image VSS1 before and after the rotation of the spherical surface image VSS1 by the user US on the basis of the direction of movement and the position of the destination of the zenith ZE on the coordinate of the spherical surface image VSS1.

The amount of change of the spherical surface image VSS1 corresponds to the amount of rotation (rotation angle) of the spherical surface image VSS1 acquired by combining the amount of rotation about the X axis (rotation angle), the amount of rotation about the Y axis (rotation angle), and the amount of rotation about the Z axis (rotation angle) in the spherical surface image VSS1. The image processing unit 111 stores the amount of change of the spherical surface image VSS1 as a correction value CV1 in association with the captured image IM1 (right-eye image IMR1 or left-eye image IML1) that is image-processed.

That is, the correction value CV1 is calculated on the basis of the rotation direction of the spherical surface image VSS1 and the moving amount or the moving angle (rotation angle of spherical surface image VSS1) of the zenith ZE. The image processing unit 111 may store the coordinates of the zenith ZE on the spherical surface image VSS1 after the rotation of the spherical surface image VSS1 by the user US as the correction value CV1.

The image processing unit 111 may store the correction value CV1 in an internal memory or an external memory. The server 106 may acquire the correction value CV1 in association with the captured image IM1 (right-eye image IMR1 or left-eye image IML1) that is image-processed from the image adjustment device 110 through the network and the communication unit 113. The server 106 stores the correction value CV1 in an internal memory or an external memory.

Figure 3D:
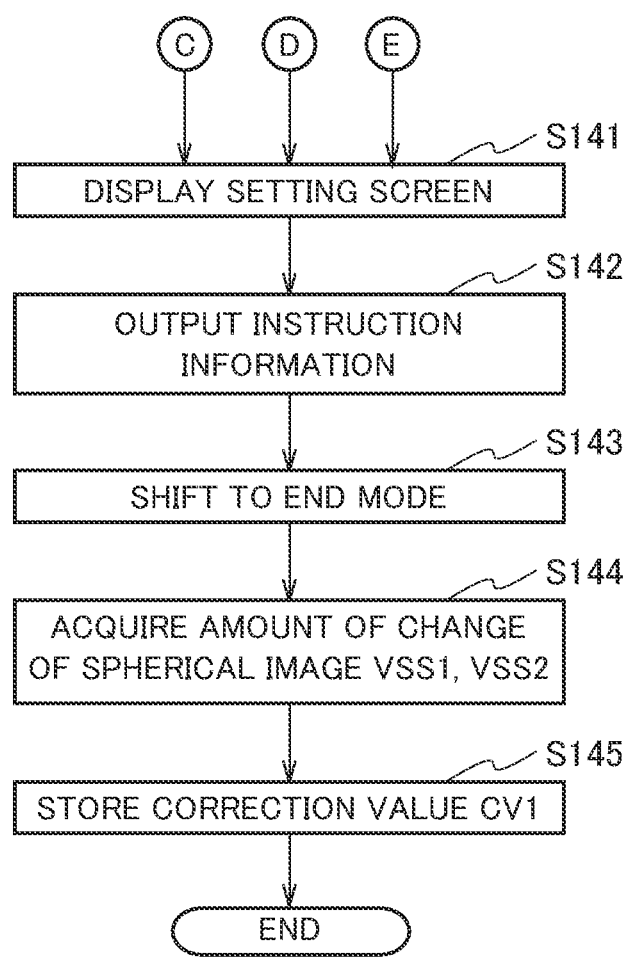
FIG. 3D is a flowchart illustrating an example of the image adjustment method according to the first embodiment.

When the user US determines that the misalignment between the right-eye image IMR1 and the left-eye image IML1 has been corrected and operates the controller 105, the image processing unit 111 ends the display of the spherical surface image VSS1 and causes the image display device 104 to display the setting screen in step S141 in FIG. 3D.

When the user US operates the controller 105 to select a predetermined item (for example, item of end) displayed on the setting screen, the controller 105 outputs the instruction information NN1 indicating the selection of the item of end to the image processing unit 111 in step S142. The image processing unit 111 shifts the processing to a predetermined processing mode corresponding to the selected item in step S143. When the item of end is selected, the image processing unit 111 shifts the processing to a processing mode (end mode) for ending the image adjustment between the right-eye image IMR1 and the left-eye image IML1.

In step S144, the image processing unit 111 acquires the amount of rotation (rotation angle) before and after the rotation of the spherical surface image VSS1 as the amount of change of the spherical surface image VSS1. In step S145, the image processing unit 111 stores the amount of change of the spherical surface image VSS1 as the correction value CV1 in association with the captured image IM1 (right-eye image IMR1 or left-eye image IML1) that is image-processed and ends the processing.

The image adjustment system 101, the image adjustment device 110, and the image adjustment method according to the first embodiment cause the image display device 104 to display the spherical surface image VSS1. In the image adjustment system 101, the image adjustment device 110, and the image adjustment method according to the first embodiment, when a misalignment occurs between the right-eye image IMR1 and the left-eye image IML1, the user US operates the controller 105 and rotates the spherical surface image VSS1, thereby simply and easily adjusting the misalignment between the right-eye image IMR1 and the left-eye image IML1 displayed on the image display device 104.

In the image adjustment system 101, the image adjustment device 110, and the image adjustment method according to the first embodiment, when the correction value CV1 is stored in the image adjustment device 110 or the server 106, the image processing unit 111 can read the correction value CV1 from the image adjustment device 110 or the server 106, adjust the captured image IM1 (right-eye image IMR1 or left-eye image IML1) captured by the camera 102 in accordance with the correction value CV1, and display the adjusted image on the image display device 104.

Second Embodiment

Figure 7:
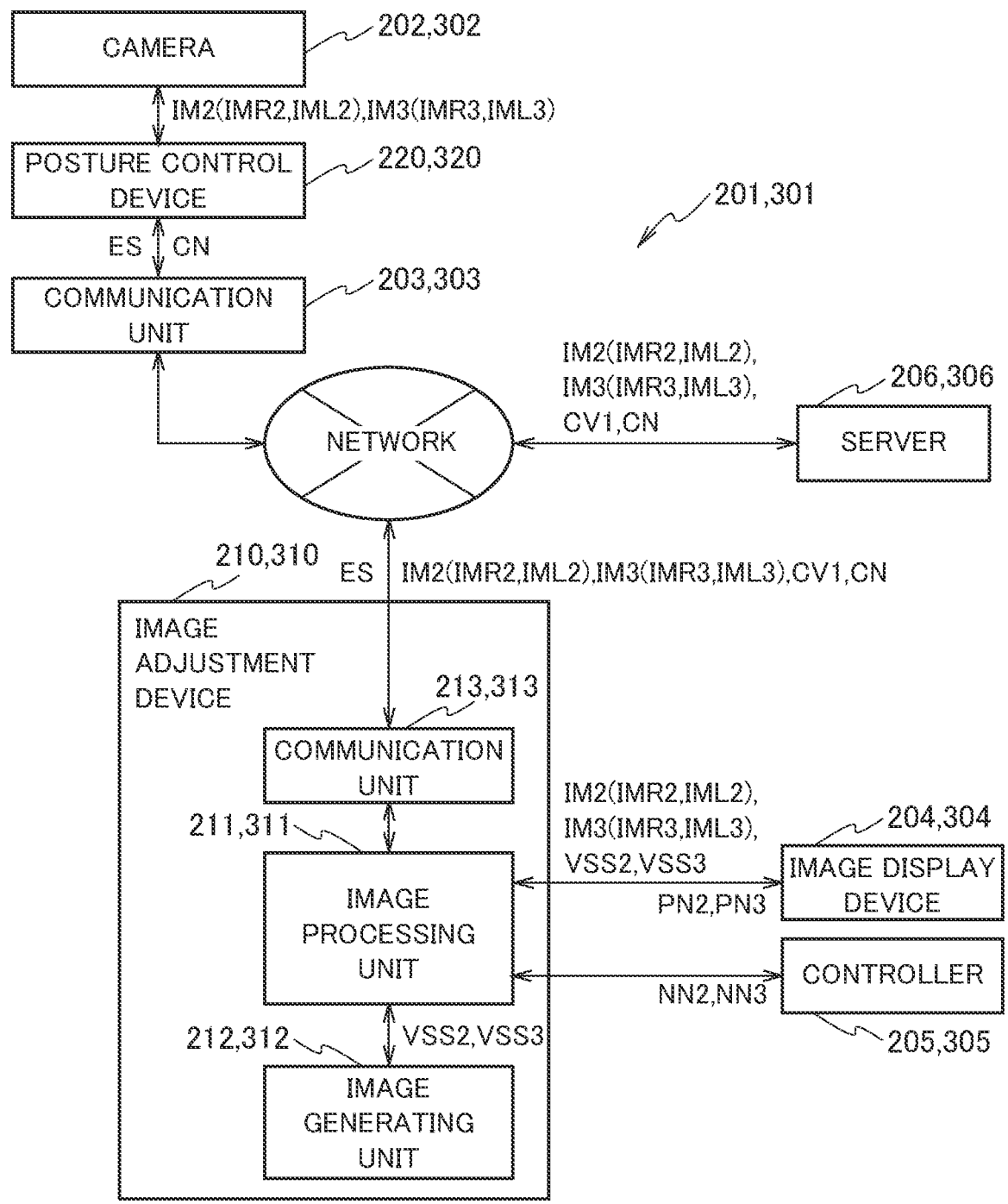
FIG. 7 is a block diagram illustrating an image adjustment system according to a second and a third embodiments.

An example of the configuration of an image adjustment system according to a second embodiment is described with reference to FIG. 7. An image adjustment system 201 includes a camera 202, a posture control device 220, a communication unit 203, an image display device 204, a controller 205, an image adjustment device 210, and a server 206. The image adjustment device 210 includes an image processing unit (image processor) 211, an image generating unit (image generator) 212, and a communication unit 213.

The camera 202, the communication unit 203, the image display device 204, the controller 205, the image adjustment device 210, and the server 206 correspond to the camera 102, the communication unit 103, the image display device 104, the controller 105, the image adjustment device 110, and the server 106 according to the first embodiment, respectively. The image processing unit 211, the image generating unit 212, and the communication unit 213 correspond to the image processing unit 111, the image generating unit 112, and the communication unit 113 according to the first embodiment, respectively.

Figure 8:
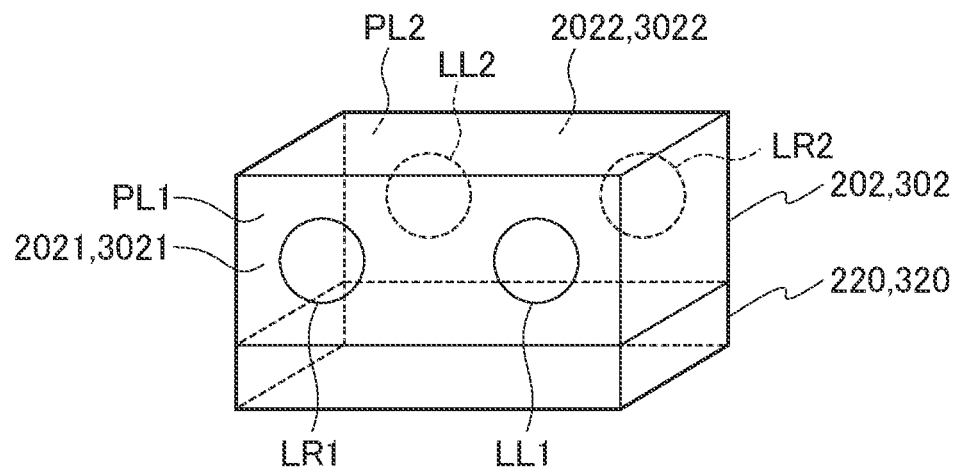
FIG. 8 is a diagram illustrating an example of a camera and a posture control device.

As illustrated in FIG. 8, the camera 202 has a first surface PL1 and a second surface PL2 that is a surface opposite to the first surface PL1. The camera 202 includes a right-eye fisheye lens LR1 and a left-eye fisheye lens LL1 arranged on the first surface PL1, and a right-eye fisheye lens LR2 and a left-eye fisheye lens LL2 arranged on the second surface PL2. Hereinafter, the right-eye fisheye lens LR1 is referred to as a first right-eye lens LR1, the left-eye fisheye lens LL1 is referred to as a first left-eye lens LL1, the right-eye fisheye lens LR2 is referred to as a second right-eye lens LR2, and the left-eye fisheye lens LL2 is referred to as a second left-eye lens LL2.

The camera 202 includes a first camera 2021 for capturing the range of 180 degrees on the first surface PL1 by using the first right-eye lens LR1 and the first left-eye lens LL1, and a second camera 2022 for capturing the range of 180 degrees on the second surface PL2 by using the second right-eye lens LR2 and the second left-eye lens LL2. That is, the camera 202 is an omnidirectional camera (360-degree camera)

capable of capturing the range of 360 degrees and is a stereo camera capable of capturing a right-eye image and a left-eye image.

The camera 202 captures the range of 360 degrees by using the first right-eye lens LR1 and the second right-eye lens LR2 that are photographic lenses and generates a right-eye image IMR2. The camera 202 captures the range of 360 degrees by using the first left-eye lens LL1 and the second left-eye lens LL2 that are photographic lenses and generates a left-eye image IML2.

Figure 9:
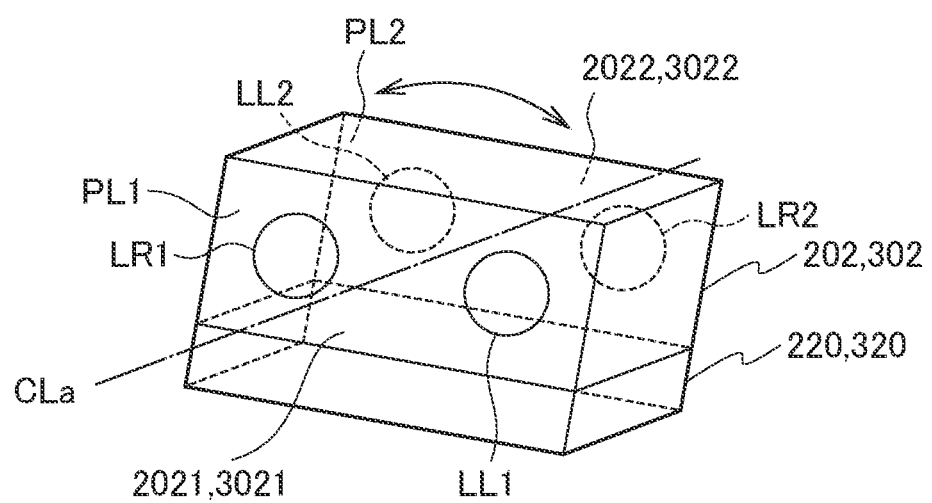
FIG. 9 is a diagram illustrating a state in which the posture control device controls a tilt of the camera in a left-right direction.

The posture control device 220 controls the posture of the camera 202. As illustrated in FIG. 9, the posture control device 220 controls a tilt of the camera 202 in the left-right direction. For example, the posture control device 220 rotates the camera 202 about a rotation axis CLa (first rotation axis) passing through the middle position of the first right-eye lens LR1 and the first left-eye lens LL1 and the middle position of the second right-eye lens LR2 and the second left-eye lens LL2 and parallel to the optical axes of the lenses LR1, LL1, LR2, and LL2, thereby controlling the tilt of the camera 202 in the left-right direction. That is, the tilt of the camera 202 in the left-right direction is a tilt of the camera 202 about the rotation axis CLa.

Figure 10:
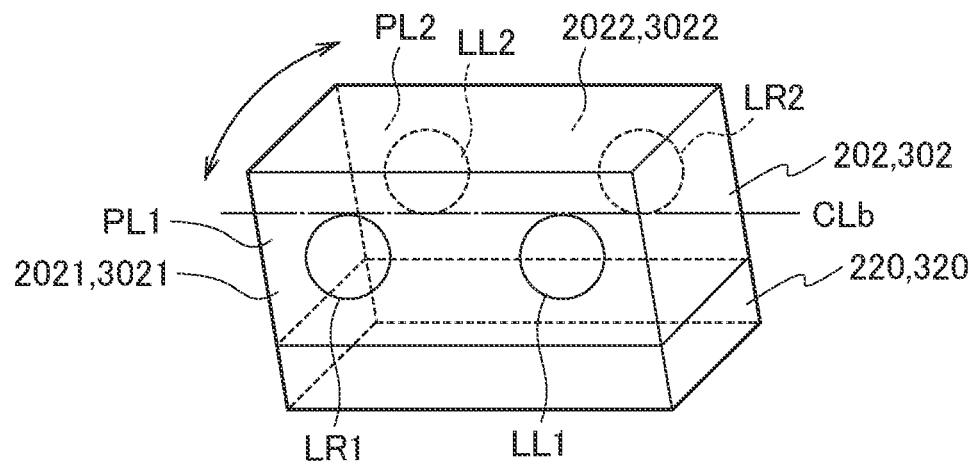
FIG. 10 is a diagram illustrating a state in which the posture control device controls a tilt of the camera in a front-rear direction.

As illustrated in FIG. 10, the posture control device 220 controls a tilt of the camera 202 in the front-rear direction. For example, the posture control device 220 rotates the camera 202 about a rotation axis CLb (second rotation axis) passing through the middle position of the first right-eye lens LR1 and the second left-eye lens LL2 and the middle position of the first left-eye lens LL1 and the second right-eye lens LR2 and orthogonal to the optical axes of the lenses LR1, LL1, LR2, and LL2, thereby controlling the tilt of the camera 202 in the front-rear direction. That is, the tilt of the camera 202 in the front-rear direction is a tilt of the camera 202 about the rotation axis CLb.

The first rotation axis CLa and the second rotation axis CLb are orthogonal to each other. With the camera 202 under horizontal posture control, the first rotation axis CLa and the second rotation axis CLb are parallel to the horizontal plane.

Figure 11:
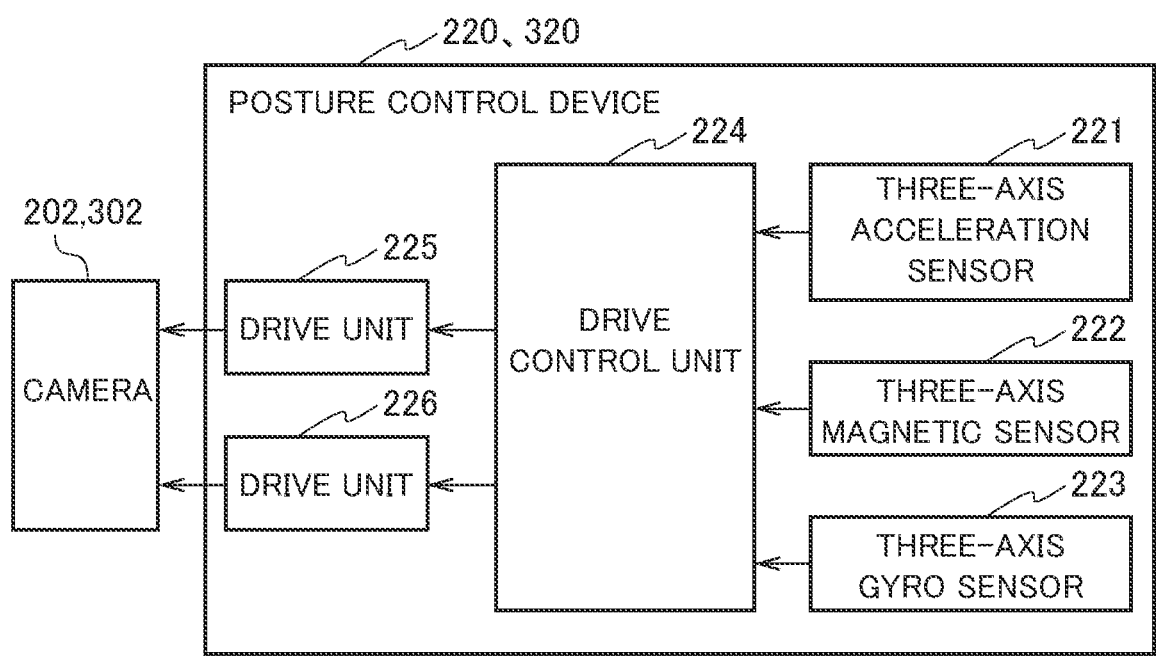
FIG. 11 is a block diagram illustrating an example of the posture control device.

As illustrated in FIG. 11, the posture control device 220 includes a three-axis acceleration sensor 221, a three-axis magnetic sensor 222, a three-axis gyro sensor 223, a drive control unit 224, and drive units 225, 226. The three-axis acceleration sensor 221 is referred to as a first sensor 221, the three-axis magnetic sensor 222 is referred to as a second sensor 222, and the three-axis gyro sensor 223 is referred to as a third sensor 223. The drive unit 225 is referred to as a first drive unit, and the drive unit 226 is referred to as a second drive unit.

The first sensor 221 acquires the tilt of the camera 202 in the left-right direction and the front-rear direction by detecting the direction of gravity. The second sensor 222 detects the magnitude and direction of the magnetic field (magnetic field), and the third sensor 223 detects the angular velocity.

The drive control unit 224 controls at least one of the drive unit 225 or the drive unit 226 on the basis of information detected by the first sensor 221. When the camera 202 is moving with acceleration or deceleration, the drive control unit 224 controls at least one of the drive unit 225 or the drive unit 226 on the basis of information detected by the first sensor 221 and information detected by at least one of the second sensor 222 or the third sensor 223. As illustrated in FIG. 9, the drive unit 225 rotates the camera 202 in the left-right direction. As illustrated in FIG. 10, the drive unit 226 rotates the camera 202 in the front-rear direction.

The image adjustment device 210 can acquire the right-eye image IMR2 and the left-eye image IML2 captured by the camera 202 in the range of 360 degrees as a captured image IM2 through the communication units 203, 213 and a network.

The server 206 is connected to the camera 202 through the network and the communication unit 203 and connected to the image adjustment device 210 through the network and the communication unit 213. The server 206 may acquire the captured image IM2 from the camera 202 through the communication unit 203 and the network, and the image adjustment device 210 may acquire the captured image IM2 from the server 206 through the network and the communication unit 213. FIG. 7 illustrates that the image adjustment device 210 or the server 206 acquires the captured image IM2 through the posture control device 220, but the image adjustment device 210 or the server 206 may acquire the captured image IM2 without the posture control device 220.

The captured image IM2 acquired by the image adjustment device 210 is input to the image processing unit 211. The image adjustment device 210 performs image processing, such as correction of distortion of the captured image IM2, and outputs the captured image IM2 that is image-processed to the image display device 204.

With the image display device 204 mounted on the head of the user US, the image adjustment device 210 displays the right-eye image IMR2 in an area corresponding to the right eye of the user US and the left-eye image IML2 in an area corresponding to the left eye of the user US, so that the user US can view the captured image IM2 as a three-dimensional image.

The server 206 may correct distortion of the captured image IM2 acquired from the camera 202, perform image processing, such as adjusting the horizontal position of the captured image IM2, and output the captured image IM2 that is image-processed to the image adjustment device 210. By mounting the image display device 204 on the head, the user US can view the captured image IM2 image-processed by the image adjustment device 210 or the server 206.

The image display device 204 generates posture information PN2 on the basis of a state of the user US, such as a direction in which the user US faces or a posture of the user US, while being mounted on the head of the user US. The image processing unit 211 acquires the posture information PN2 from the image display device 204. That is, the image processing unit 211 acquires the posture information PN2 on the basis of the posture of the image display device 204. The image processing unit 211 displays on the image display device 204 an image of an area corresponding to the state of the user US, such as a direction in which the user US faces or a posture of the user US, from the captured image IM2 on the basis of the posture information PN2.

The controller 205 generates instruction information NN2 on the basis of a state of the user US, such as a movement of the hand or a posture of the user US, while being attached to the hand of the user US. The image processing unit 211 acquires the instruction information NN2 from the controller 205. The image processing unit 211 can change or adjust the captured image IM2 displayed on the image display device 204 on the basis of the instruction information NN2.

The image generation unit 212 generates a spherical surface image VSS2 that is a virtual image made up by a spherical surface, which is CG, and stores the spherical surface image VSS2 in an internal memory or an external memory. The image processing unit 211 acquires the spherical surface image VSS2 from the image generating unit 212 on the basis of the instruction information NN2 and displays the spherical surface image VSS2 on the image display device 204. The spherical surface image VSS2 corresponds to the spherical surface image VSS1 according to the first embodiment. The user US feels as if the hand of the user US is in contact with the spherical surface image VSS2 by moving the hand to which the controller 205 is attached to a position corresponding to the spherical surface image VSS2 displayed on the image display device 204.

The controller 205 may include an actuator arranged at a part to be in contact with the hand of the user US. The image processing unit 211 operates the actuator when determining that the hand of the user US has moved to a position corresponding to the spherical surface image VSS2 on the basis of the instruction information NN2. When the actuator applies pressure to the hand of the user US, the user US can actually obtain a sense of the hand in contact with the spherical surface image VSS2.

When the spherical surface image VSS2 is displayed on the image display device 204 and the user US moves the hand to which the controller 205 is attached in an arbitrary direction, the image processing unit 211 performs image processing on the basis of the instruction information NN2 so that the spherical surface image VSS2 and the captured image IM2 displayed on the image display device 204 move in accordance with a moving direction, a moving speed, and a destination position of the hand of the user US.

The user US can rotate the spherical surface image VSS2 in any direction, at any speed, to any position by moving the hand in any direction, at any speed, to any position. That is, the user US can rotate the spherical surface image VSS2 by the movement of the hand. The image processing unit 211 moves the captured image IM2 in accordance with the rotation of the spherical surface image VSS2.

In the posture control device 220, the drive control unit 224 acquires the horizontal plane on the basis of information detected by at least one of the first sensor 221, the second sensor 222, or the third sensor 223 and acquires a tilt angle θa (first tilt angle) of the camera 202 in the left-right direction with respect to the horizontal plane and a tilt angle θb (second tilt angle) of the camera 202 in the front-rear direction with respect to the horizontal plane.

The drive control unit 224 controls the drive unit 225 so that the tilt angle θa is equal to or less than a predetermined angle α (first angle) (θa≤α), thereby adjusting the posture of the camera 202 in the left-right direction. The drive control unit 224 controls the drive unit 225 so that the tilt angle θb becomes equal to or less than a predetermined angle β (second angle) (θb≤β), thereby adjusting the posture of the camera 202 in the front-rear direction.

As illustrated in FIG. 9, when the camera 202 is viewed from the first surface PL1 and inclined to the right, for example, the first right-eye lens LR1 is positioned higher than the first left-eye lens LL1 on the first surface PL1. In contrast, the second right-eye lens LR2 is positioned lower than the second left-eye lens LL2 on the second surface PL2.

Thus, the parallax between the right-eye image IMR2 and the left-eye image IML2 on the first surface PL1 is reverse to that on the second surface PL2, and the user US feels uncomfortable with the captured image IM2 displayed on the image display device 204. In contrast, when the camera 202 is inclined in the front-rear direction, the parallax between the right-eye image IMR2 and the left-eye image IML2 on the first surface PL1 is not reverse to that on the second surface PL2, so that the user US hardly feels uncomfortable with the captured image IM2 displayed on the image display device 204.

For the above reason, the angle α is set to be smaller than the angle β (α<β). For example, the angle α is set to 1 degree, and the angle β is set to 5 degrees. Accordingly, the drive control unit 224 controls at least one of the drive unit 225 or the drive unit 226 so that the tilt angle θa in the left-right direction is smaller than the tilt angle θb in the front-rear direction (θa<θb), thereby controlling the posture of the camera 202.

After the posture control device 220 controls the posture of the camera 202, the image adjustment system 201 performs similar processing as in step S101, steps S111 to S118, steps S121 to S128, steps S131 to S138, or steps S141 to S144 according to the first embodiment.

The image adjustment system 201, the image adjustment device 210, and the image adjustment method according to the second embodiment cause the image display device 204 to display the spherical surface image VSS2. In the image adjustment system 201, the image adjustment device 210, and the image adjustment method according to the second embodiment, when a misalignment occurs between the right-eye image IMR2 and the left-eye image IML2, the user US operates the controller 205 to rotate the spherical surface image VSS2, thereby simply and easily adjusting the misalignment between the right-eye image IMR2 and the left-eye image IML2 displayed on the image display device 204.

In the image adjustment system 201, the image adjustment device 210, and the image adjustment method according to the second embodiment, when the correction value CV1 is stored in the image adjustment device 210 or the server 206, the image processing unit 211 can read the correction value CV1 from the image adjustment device 210 or the server 206, adjust the captured image IM2 (right-eye image IMR2 or left-eye image IML2) captured by the camera 202 in accordance with the correction value CV1, and display the adjusted image on the image display device 204.

In the image adjustment system 201, the image adjustment device 210, and the image adjustment method according to the second embodiment, the posture of the camera 202 is controlled to be horizontal or nearly horizontal by the posture control device 220. While the posture of the camera 202 is controlled, the user US adjusts the misalignment between the right-eye image IMR2 and the left-eye image IML2, and thus the above-described misalignment is simply and easily adjusted.

Third Embodiment

An example of the configuration of an image adjustment system according to a third embodiment is described with reference to FIG. 7. An image adjustment system 301 includes a camera 302, a posture control device 320, a communication unit 303, an image display device 304, a controller 305, an image adjustment device 310, and a server 306. The image adjustment device 310 includes an image processing unit 311, an image generating unit 312, and a communication unit 313.

The camera 302, the posture control device 320, the communication unit 303, the image display device 304, the controller 305, the image adjustment device 310, and the server 306 correspond to the camera 202, the posture control device 220, the communication unit 203, the image display device 204, the controller 205, the image adjustment device 210, and the server 206 according to the second embodiment, respectively. The image processing unit 311, the image generating unit 312, and the communication unit 313 correspond to the image processing unit 211, the image generating unit 212, and the communication unit 213 according to the second embodiment, respectively. For clarity of explanation, the same components as those according to the second embodiment are denoted by the same reference numerals.

As illustrated in FIG. 8, the camera 302 includes a first camera 3021 for capturing the range of 180 degrees on the first surface PL1 by using the first right-eye lens LR1 and the first left-eye lens LL1, and a second camera 3022 for capturing the range of 180 degrees on the second surface PL2 by using the second right-eye lens LR2 and the second left-eye lens LL2. The first and second cameras 3021, 3022 correspond to the first and second cameras 2021, 2022 according to the second embodiment. That is, the camera 302 is an omnidirectional camera (360-degree camera) capable of capturing the range of 360 degrees and is a stereo camera capable of capturing a right-eye image and a left-eye image.

The camera 302 captures the range of 360 degrees by using the first right-eye lenses LR1 and the second right-eye lenses LR2 and generates a right-eye image IMR3. The camera 302 captures the range of 360 degrees by using the first left-eye lenses LL1 and the second left-eye lenses LL2 and generates a left-eye image IML3.

The posture control device 320 controls the posture of the camera 302. As illustrated in FIG. 9, the posture control device 320 controls the tilt of the camera 302 in the left-right direction. For example, the posture control device 320 rotates the camera 302 about the rotation axis CLa to control the tilt of the camera 302 in the left-right direction. That is, the tilt of the camera 302 in the left-right direction is a tilt of the camera 302 about the rotation axis CLa. As illustrated in FIG. 10, the posture control device 320 may control the tilt of the camera 302 in the front-rear direction. For example, the posture control device 320 rotates the camera 302 about the rotation axis CLb to control the tilt of the camera 302 in the front-rear direction. That is, the tilt of the camera 302 in the front-rear direction is a tilt of the camera 302 about the rotation axis CLb.

As illustrated in FIG. 11, the posture control device 320 includes the three-axis acceleration sensor 221 (first sensor), the three-axis magnetic sensor 222 (second sensor), the three-axis gyro sensor 223 (third sensor), the drive control unit 224, the drive unit 225, and the drive unit 226. When the camera 302 is moving with acceleration or deceleration, the drive control unit 224 controls at least one of the drive unit 225 or the drive unit 226 on the basis of information detected by the first sensor 221 and information detected by at least one of the second sensor 222 or the third sensor 223.

The image adjustment device 310 can acquire the right-eye image IMR3 and the left-eye image IML3 captured by the camera 302 in the range of 360 degrees as the captured image IM3 through the communication units 303, 313 and a network.

The server 306 is connected through the network and the communication unit 303 to the camera 302 and connected through the network and the communication unit 313 to the image adjustment device 310. The server 306 may acquire the captured image IM3 from the camera 302 through the communication unit 303 and the network, and the image adjustment device 310 may acquire the captured image IM3 from the server 306 through the network and the communication unit 313. FIG. 7 illustrates that the image adjustment device 310 or the server 306 acquires the captured image IM3 through the posture control device 320, but the image adjustment device 310 or the server 306 may acquire the captured image IM3 without the posture control device 320.

The captured image IM3 acquired by the image adjustment device 310 is input to the image processing unit 311. The image adjustment device 310 performs image processing, such as correction of distortion of the captured image IM3, and outputs the captured image IM3 that is image-processed to the image display device 304.

With the image display device 304 mounted on the head of the user US, the image adjustment device 310 displays the right-eye image IMR3 in an area corresponding to the right eye of the user US and the left-eye image IML3 in an area corresponding to the left eye of the user US, so that the user US can view the captured image IM3 as a three-dimensional image.

The server 306 may correct distortion of the captured image IM3 acquired from the camera 302, perform image processing, such as adjustment of the horizontal position of the captured image IM3, and output the captured image IM3 that is image-processed to the image adjustment device 310. By mounting the image display device 304 on the head, the user US can view the captured image IM3 image-processed by the image adjustment device 310 or the server 306.

The image display device 304 generates posture information PN3 on the basis of a state of the user US, such as a direction in which the user US faces or a posture of the user US, while being mounted on the head of the user US. The image processing unit 311 acquires the posture information PN3 from the image display device 304. That is, the image processing unit 311 acquires the posture information PN3 on the basis of the posture of the image display device 304. The image processing unit 311 displays on the image display device 304 an image of an area corresponding to the state of the user US, such as a direction in which the user US faces or a posture of the user US, from the captured image IM3 on the basis of the posture information PN3.

The controller 305 generates instruction information NN3 on the basis of a state of the user US, such as a movement of the hand or a posture of the user US, while being attached to the hand of the user US. The image processing unit 311 acquires the instruction information NN3 from the controller 305. The image processing unit 311 can change or adjust the captured image IM3 displayed on the image display device 304 on the basis of the instruction information NN3.

The image generation unit 312 generates a spherical surface image VSS3 that is a virtual image made up by a spherical surface, which is CG, and stores the spherical surface image VSS3 in an internal memory or an external memory. The image processing unit 311 acquires the spherical surface image VSS3 from the image generating unit 312 on the basis of the instruction information NN3 and displays the spherical surface image VSS3 on the image display device 304. The spherical surface image VSS3 corresponds to the spherical surface images VSS1, VSS2 according to the first and second embodiments. The user US feels as if the hand of the user US is in contact with the spherical surface image VSS3 by moving the hand to which the controller 305 is attached to a position corresponding to the spherical surface image VSS3 displayed on the image display device 304.

The controller 305 may include an actuator arranged at a part to be in contact with the hand of the user US. The image processing unit 311 operates the actuator when determining that the hand of the user US has moved to a position corresponding to the spherical surface image VSS3 on the basis of the instruction information NN3. When the actuator applies pressure to the hand of the user US, the user US can actually obtain a sense of the hand in contact with the spherical surface image VSS3.

When the spherical surface image VSS3 is displayed on the image display device 304 and the user US moves the hand to which the controller 305 is attached in an arbitrary direction, the image processing unit 311 performs image processing on the basis of the instruction information NN3 so that the spherical surface image VSS3 and the captured image IM3 displayed on the image display device 304 move in accordance with a moving direction, a moving speed, and a destination position of the hand of the user US.

The user US can rotate the spherical surface image VSS3 in any direction, at any speed, to any position by moving the hand in any direction, at any speed, to any position. That is, the user US can rotate the spherical surface image VSS3 by the movement of the hand. The image processing unit 311 moves the captured image IM3 in accordance with the rotation of the spherical surface image VSS3.

Figure 12A:
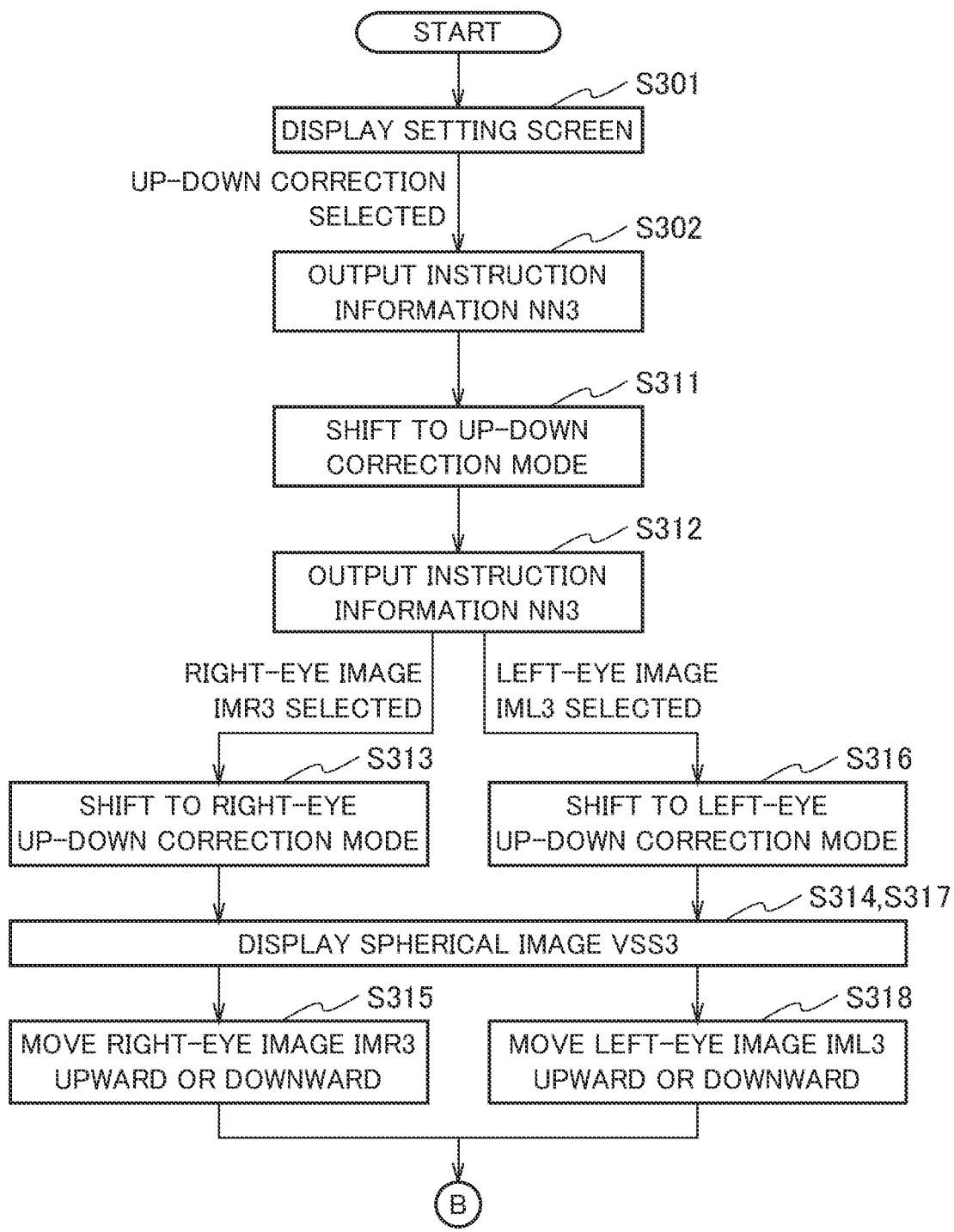
FIG. 12A is a flowchart illustrating an example of an image adjustment method according to the third embodiment.
Figure 12B:
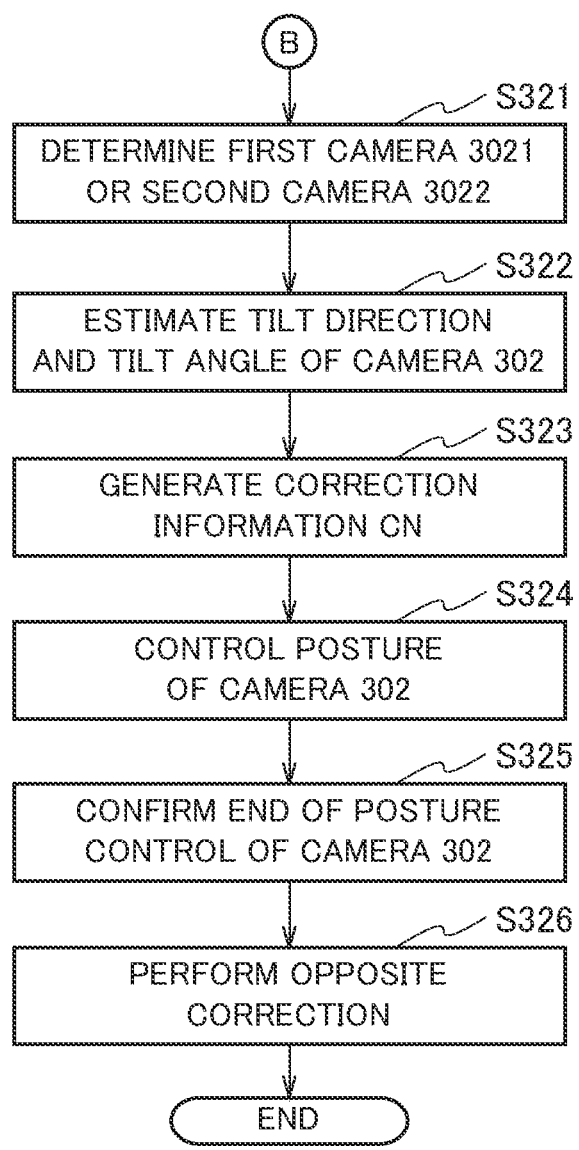
FIG. 12B is a flowchart illustrating an example of the image adjustment method according to the third embodiment.

With reference to flowcharts in FIGS. 12A and 12B, an example of an image adjustment method according to the third embodiment is described. Specifically, an example of a method of adjusting misalignment in the up-down direction between the right-eye image IMR3 and the left-eye image IML3 is described. The image display device 304 is mounted on the head of the user US, and the controller 305 is attached to the hand of the user US. The image display device 304 displays the captured image IM3 (right-eye image IMR3 and left-eye image IML3).

When the user US corrects a misalignment in the up-down direction between the right-eye image IMR3 and the left-eye image IML3 displayed on the image display device 304, the user US operates the controller 305, so that the image processing unit 311 causes the image display device 304 to display a setting screen in step S301 of FIG. 12A.

The setting screen displays, for example, an item of up-down correction for correcting a misalignment in the up-down direction between the right-eye image IMR3 and the left-eye image IML3, as an adjustment item. The image processing unit 311 may display adjustment items on the setting screen, such as an item of parallax correction for correcting a parallax between the right-eye image IMR3 and the left-eye image IML3 and an item of tilt correction for correcting a difference in tilt between the right-eye image IMR3 and the left-eye image IML3.

As illustrated in FIG. 4, when the right-eye image IMR3 and the left-eye image IML3 are misaligned in the up-down direction, the user US selects the item of up-down correction displayed on the setting screen. In step S302, the controller 305 outputs the instruction information NN3 indicating the selection of the item of up-down correction to the image processing unit 311. In step S311, the image processing unit 311 shifts processing to a processing mode (up-down correction mode) for correcting a misalignment in the up-down direction between the right-eye image IMR3 and the left-eye image IML3 on the basis of the instruction information NN3 output from the controller 305.

In step S312, the image processing unit 311 displays an item for selecting whether the image to be corrected is the right-eye image IMR3 or the left-eye image IML3 on the image display device 304. When the user US selects the right-eye image IMR3, the controller 305 outputs the instruction information NN3 indicating the selection of the right-eye image IMR3 to the image processing unit 311. In step S313, the image processing unit 311 shifts the processing to a processing mode (right-eye up-down correction mode) for correcting the up-down direction of the right-eye image IMR3 on the basis of the instruction information NN3 output from the controller 305.

In step S314, the image processing unit 111 acquires the spherical surface image VSS3 from the image generating unit 312 and displays the spherical surface image VSS3 on the image display device 204. Displayed on the image display device 204 is a blend of the captured image IM3 (right-eye image IMR3 and left-eye image IML3) and the spherical surface image VSS3.

The user US rotates the spherical surface image VSS3 upward or downward to reduce the misalignment in the up-down direction between the right-eye image IMR3 and the left-eye image IML3. In step S315, the image processing unit 311 moves the right-eye image IMR3 displayed on the image display device 304 upward or downward in accordance with the rotation of the spherical surface image VSS3.

In step S312, when the user US selects the left-eye image IML3, the controller 305 outputs the instruction information NN3 indicating the selection of the left-eye image IML3 to the image processing unit 311. In step S316, the image processing unit 311 shifts the processing to a processing mode (left-eye up-down correction mode) for correcting the up-down direction of the left-eye image IML3 on the basis of the instruction information NN3 output from the controller 305.

In step S317, the image processing unit 311 acquires the spherical surface image VSS3 from the image generating unit 312 and displays the spherical surface image VSS3 on the image display device 304. Displayed on the image display device 304 is a blend of the captured image IM3 (right-eye image IMR3 and left-eye image IML3) and the spherical surface image VSS3.

The user US rotates the spherical surface image VSS3 upward or downward to reduce the misalignment in the up-down direction between the right-eye image IMR3 and the left-eye image IML3. In step S318, the image processing unit 311 moves the left-eye image IML3 displayed on the image display device 304 upward or downward in accordance with the rotation of the spherical surface image VSS3.

The image processing unit 311 may limit the direction of rotation of the spherical surface image VSS3 so that the spherical surface image VSS3 rotates only in the up-down direction, when shifting the processing to the up-down correction mode in step S311, the right-eye up-down correction mode in step S313, or the left-eye up-down correction mode in step S316. The right-eye image IMR3 or the left-eye image IML3 may be moved upward or downward by moving the spherical surface image VSS3 upward or downward without rotating the spherical surface image VSS3.

The image processing unit 311 can determine a position on the coordinate of the spherical surface image VSS3 to which the zenith ZE before rotation of the spherical surface image VSS3 by the user US has moved by the rotation of the spherical surface image VSS3 by the user US. The image processing unit 311 calculates the amount of change of the spherical surface image VSS3 before and after the rotation of the spherical surface image VSS3 by the user US on the basis of the direction of movement and the position of the destination of the zenith ZE on the coordinates of the spherical surface image VSS3. The amount of change of the spherical surface image VSS3 corresponds to that of the spherical surface image VSS1.

As illustrated in FIG. 9, when the camera 302 is inclined in the left-right direction, the right-eye image IMR3 and the left-eye image IML3 are misaligned in the up-down direction as illustrated in FIG. 4. Accordingly, when the user US rotates the spherical surface image VSS3 to adjust the captured image IM3, the misalignment in the up-down direction between the right-eye image IMR3 and the left-eye image IML3 displayed on the image display device 304 may not be sufficiently corrected.

In FIG. 12B, in step S321, the image processing unit 311 determines whether the captured image IM3 displayed on the image display device 304 is captured by the first camera 3021 or the second camera 3022 on the basis of the posture information PN3 or the captured image IM3 displayed on the image display device 304.

In step S322, the image processing unit 311 estimates a tilt direction and a tilt angle of the camera 302 on the basis of the determination result in step S321 (first camera 3021 or second camera 3022), and the instruction information NN3 or the adjustment direction (upward or downward) and the adjustment amount of the captured image IM3 displayed on the image display device 304. Assuming that the distance between the right-eye image IMR3 and the left-eye image IML3 displayed on the image display device 304 is d and the adjustment amount in the upward or downward direction is h, the tilt angle θa of the camera 302 is calculated by a relational expression θa=tan−1(h/d)

In step S323, the image processing unit 311 generates correction information CN for correcting the position of the camera 302 on the basis of the estimation result in step S322 (specifically, the tilt direction and tilt angle of the camera 302). Further, the image processing unit 311 outputs the correction information CN to the posture control device 320 through the communication units 313, 303 and the network. The image processing unit 311 may output the correction information CN to the server 306 through the communication unit 313 and the network, and the server 306 may output the correction information CN to the posture control device 320 through the network and the communication unit 303.

In step S324, the posture control device 320 controls the posture of the camera 302 on the basis of the correction information CN. In step S325, the image processing unit 311 confirms the end of the posture control of the camera 302 by the posture control device 320. The posture control device 320 may generate an end signal ES indicating the end of the posture control of the camera 302 and output the end signal ES to the image processing unit 311 through the communication units 303, 313 and the network.

In step S326, the image processing unit 311 ends the display of the spherical surface image VSS3 and performs a correction opposite to that in step S315 or step S318. For example, when the right-eye image IMR3 is moved upward in step S315, the image processing unit 311 moves the right-eye image IMR3 downward and performs image processing so that the right-eye image IMR3 is in a state before the processing of step S315 is performed. For example, when the left-eye image IML3 is moved downward in step S318, the image processing unit 311 moves the left-eye image IML3 upward and performs image processing so that the left-eye image IML3 is in a state before the processing of step S318 is performed.

That is, by controlling the posture of the camera 302 by the posture control device 320, the image processing unit 311 performs the image processing to return the processing to the state before the processing of step S315 is performed for the right-eye image IMR3 or to the state before the processing of step S318 is performed for the left-eye image IML3 and ends the processing.

The image adjustment system 301, the image adjustment device 310, and the image adjustment method according to the third embodiment cause the image display device 304 to display the spherical surface image VSS3. In the image adjustment system 301, the image adjustment device 310, and the image adjustment method according to the third embodiment, when a misalignment occurs between the right-eye image IMR3 and the left-eye image IML3, the user US operates the controller 305 to rotate the spherical surface image VSS3, thereby simply and easily adjusting the misalignment between the right-eye image IMR3 and the left-eye image IML3 displayed on the image display device 304.

In the image adjustment system 301, the image adjustment device 310, and the image adjustment method according to the third embodiment, the tilt direction and the tilt angle of the camera 302 are estimated on the basis of the adjustment result of the captured image IM3 by the image adjustment device 310, and the posture control device 320 controls the posture of the camera 302 on the basis of the estimation result. The posture of the camera 302 is controlled to be horizontal or nearly horizontal by the posture control device 320, and thus when the user US adjusts a misalignment between the right-eye image IMR3 and the left-eye image IML3, the above-described misalignment is simply and easily adjusted.

The present invention is not limited to the above-described embodiments, and various modifications can be made without departing from the gist of the present invention.

For example, a virtual image VSS generated by CG may be an ellipsoidal surface (ellipsoid) and may be any closed surface (closed surface) within reach of the hand of the user US. That is, it is only necessary to obtain a sense that the user US comes in contact with the closed surface from the inside, so that the horizontal adjustment of the captured image IM is performed. As the user US rotates the virtual image VSS, the virtual image VSS preferably has a spherical surface or a spherical shape close to a spherical surface, such as an ellipsoid.

The image adjustment system, the image adjustment device, and the image adjustment method according to the present embodiments simply and easily correct the misalignment between the right-eye image and the left-eye image.

What is claimed is:
1. An image adjustment system, comprising:
  a camera configured to capture a right-eye image and a left-eye image;
  an image adjustment device configured to acquire the right-eye image and the left-eye image from the camera as a captured image and adjust the captured image;
  an image display device configured to display the captured image adjusted by the image adjustment device; and
  a controller configured to output instruction information to the image adjustment device, wherein
  the image adjustment device comprises:
  an image generator configured to generate a spherical surface image; and
  an image processor configured to acquire the spherical surface image from the image generator to display the spherical surface image on the image display device on the basis of the instruction information, rotate the spherical surface image on the basis of the instruction information, and adjust the right-eye image or the left-eye image of the captured image displayed on the image display device in accordance with a rotation of the spherical surface image.
2. The image adjustment system according to claim 1, further comprising:

a posture control device configured to control a posture of the camera so that a tilt angle of the camera in a left-right direction is smaller than a tilt angle of the camera in a front-rear direction.

3. The image adjustment system according to claim 2, wherein
the camera comprises a photographic lens,
the posture control device controls a tilt of the camera in the left-right direction about a first rotation axis parallel to an optical axis of the photographic lens and a tilt of the camera in the front-rear direction about a second rotation axis orthogonal to the optical axis of the photographic lens.

4. The image adjustment system according to claim 1, further comprising:
a posture control device configured to control a posture of the camera, wherein
the image processor estimates a tilt direction and a tilt angle of the camera on the basis of the instruction information or an adjustment direction and an adjustment amount of the captured image displayed on the image display device and generates correction information on the basis of an estimation result, and
the posture control device controls the posture of the camera on the basis of the correction information.

5. The image adjustment system according to claim 4, wherein
upon an end of posture control of the camera by the posture control device, the image processor returns the right-eye image or the left-eye image to a state before adjustment.

6. The image adjustment system according to claim 1, wherein
the camera is an omnidirectional camera configured to capture a range of 360 degrees,
the image display device is a head-mounted display mountable on a head of a user,
the controller is a glove type controller attachable to a hand of the user, and
when the user views the spherical surface image displayed on the image display device with the image display device mounted on the head of the user, the spherical surface image is a virtual image arranged around the user and the image display device and set to be displayed within reach of the hand or a finger of the user on the spherical surface image.

7. The image adjustment system according to claim 6, wherein
when the user moves the hand or the finger of the user to an arbitrary direction with the controller attached to the hand of the user, the image processor rotates the spherical surface image in accordance with a movement of the hand or the finger of the user on the basis of the instruction information and adjusts the right-eye image or the left-eye image of the captured image displayed on the image display device in accordance with a rotation of the spherical surface image.

8. The image adjustment system according to claim 7, wherein
the image processor acquires an amount of change before and after a rotation of the spherical surface image and adjusts the captured image on the basis of the amount of change.

9. An image adjustment device, comprising:
an image generator configured to generate a spherical surface image; and
an image processor configured to acquire the spherical surface image from the image generator to display the spherical surface image on an image display device on the basis of instruction information acquired from a controller, rotate the spherical surface image on the basis of the instruction information, and adjust a right-eye image or a left-eye image of a captured image captured by a camera and displayed on the image display device in accordance with a rotation of the spherical surface image.

10. The image adjustment device according to claim 9, wherein
a posture of the camera is controlled by a posture control device so that a tilt angle of the camera in a left-right direction is smaller than a tilt angle of the camera in a front-rear direction.

11. The image adjustment device according to claim 10, wherein
the image processor estimates a tilt direction and a tilt angle of the camera on the basis of the instruction information or an adjustment direction and an adjustment amount of the captured image displayed on the image display device and generates correction information for the posture control device to control the posture of the camera on the basis of an estimation result.

12. A method of adjusting an image, comprising:
capturing a right-eye image and a left-eye image by a camera;
acquiring the right-eye image and the left-eye image from the camera as a captured image by an image processor;
displaying the captured image by an image display device;
acquiring instruction information from a controller by the image processor;
acquiring a spherical surface image from an image generator by the image processor on the basis of the instruction information;
displaying the spherical surface image by the image display device;
rotating the spherical surface image by the image processor on the basis of the instruction information; and
adjusting the right-eye image or the left-eye image of the captured image displayed on the image display device by the image processor in accordance with a rotation of the spherical surface image.

13. The method according to claim 12, further comprising:
controlling a posture of the camera by a posture control device so that a tilt angle of the camera in a left-right direction is smaller than a tilt angle of the camera in a front-rear direction.

14. The method according to claim 12, further comprising:
estimating a tilt direction and a tilt angle of the camera by the image processor on the basis of the instruction information or an adjustment direction and an adjustment amount of the captured image displayed on the image display device;
generating correction information by the image processor on the basis of an estimation result; and
controlling the posture of the camera by a posture control device on the basis of the correction information.

* * * * *